(12) United States Patent  
Bernard et al.

(10) Patent No.: US 8,139,605 B2
(45) Date of Patent: Mar. 20, 2012

(54) UPGRADE RESILIENT MULTI-TRANSPORT OPTICAL NETWORK TERMINAL

(75) Inventors: Christopher T. Bernard, Wayzata, MN (US); Charles J. Eddleston, Minneapolis, MN (US)

(73) Assignee: Calix, Inc., Petaluma, CA (US)

( * ) Notice: Subject to any disclaimer, the term of this patent is extended or adjusted under 35 U.S.C. 154(b) by 372 days.

(21) Appl. No.: 12/115,220

(22) Filed: May 5, 2008

(65) Prior Publication Data

US 2009/0274463 A1   Nov. 5, 2009

(51) Int. Cl.
*H04J 3/22* (2006.01)
(52) U.S. Cl. .................. 370/466; 370/401; 398/168
(58) Field of Classification Search .......... 370/401, 370/466; 398/168
See application file for complete search history.

(56) References Cited

U.S. PATENT DOCUMENTS

| 7,298,746 | B1 * | 11/2007 | De La Iglesia et al. ....... 370/394 |
| 7,643,753 | B2 * | 1/2010 | Weitz et al. ................... 398/67 |
| 2004/0264961 | A1 * | 12/2004 | Nam et al. .................... 398/58 |
| 2006/0275036 | A1 * | 12/2006 | Hochbaum et al. ............ 398/67 |
| 2007/0211763 | A1 * | 9/2007 | Solomon et al. .............. 370/498 |
| 2007/0291764 | A1 * | 12/2007 | Wu ............................ 370/395.5 |

OTHER PUBLICATIONS

"Series I: Integrated Services Digital Network", ITU-T Recommendation I.363.1, International Telecommunication Union, Aug. 1996, 47 pages.

* cited by examiner

*Primary Examiner* — Jason Mattis
(74) *Attorney, Agent, or Firm* — Shumaker & Sieffert, P.A.

(57) ABSTRACT

This disclosure is directed to devices and methods for facilitating the upgrade of optical networks. An optical network terminal (ONT) that terminates an optical fiber link of an optical network comprises two or more transport engines that each converts data transmitted via different transports to data corresponding to a service. For example, the ONT may include a first transport engine and a second transport engine. The first transport engine converts data received over the optical network via a first transport, e.g., a legacy transport, into data corresponding to a service for one or more subscriber devices. The second transport engine converts the data received over the optical network via a second transport, e.g., a next generation transport, into the data corresponding to the service for the subscriber devices. The ONT is selectively configurable to select one of the first and second transport engines, thereby making the ONT upgrade-resilient.

30 Claims, 5 Drawing Sheets

UPGRADE RESILIENT MULTI-TRANSPORT OPTICAL NETWORK TERMINAL

TECHNICAL FIELD

The invention relates to optical networks and, more particularly, network interface devices for optical networks.

BACKGROUND

Optical networks are used to deliver services to multiple network subscribers using one or more optical fibers. The optical networks deployed to deliver the services may be passive or active. In a passive optical network (PON), for example, passive optical splitters and combiners enable multiple subscribers to share the same optical fiber. Thus, the PON functions as a point-to-multipoint network. A PON may conform to any of a variety of PON standards, such as the broadband PON (BPON) standard (ITU G.983), the gigabit-capable PON (GPON) standard (ITU G.984), Ethernet PON (EPON) standard (IEEE 802.3), and gigabit-EPON (GE-PON) standard, as well as future PON standards under development by organizations such as the Full Service Access Network (FSAN) Group. In an active optical network, such as an active Ethernet optical network, the optical network operates as a point-to-point network. When fiber reaches a premise where one or more subscriber devices are located, the service is commonly referred to as Fiber to the Premises (FTTP).

In FTTP services, an optical node terminal (ONT) terminates an optical fiber that extends to a subscriber premise, such as a business or enterprise, and connects the subscriber devices, such as public branch exchange (PBX) devices, routers, or other subscriber devices to the optical network. The ONT delivers the signals on the optical fiber to the subscriber devices to provide the FTTP services, and receives signals from the subscriber devices and transmits the signals upstream via the optical network. In this manner, the ONT may support a wide variety of services, such as digital signal-1 (commonly referred to as "T1") services, over the optical network.

Typically, the optical network couples to a network, such as a wide area network (WAN), a metropolitan area network (MAN) or the like, that interconnects one or more optical networks together and may also interconnect these optical networks to a public network, such as the Internet. The WAN may be referred to as a backbone network because it interconnects or provides the backbone to support delivery of information for a plurality of networks, such as the optical network. The backbone network may use any of a variety of transports to transfer information to and from the optical network. For example, the backbone network may comprise a network that implements synchronous optical networking (SONET) and that transports the information to and from the optical network using a legacy transport, such as an asynchronous transport mode (ATM) or ATM transport. As another example, the backbone network may transport information to and from the optical network using next generation transport, such as an Ethernet transport. Next generation Ethernet transports may better utilize the bandwidth of the underlying fiber links of the backbone networks.

Network administrators that maintain a backbone network using legacy ATM transports may upgrade the backbone network to utilize next generation Ethernet transports to more efficiently utilize bandwidth within the backbone network. However, upgrading the backbone network often requires replacing or upgrading the ONTs responsible for handling the legacy ATM transport. To replace or upgrade an ONT, a technician typically visits the subscriber premises, removes the legacy ONT and replaces the legacy ONT with a next generation ONT capable of handling the next generation Ethernet transport. Hence, replacement and upgrade of an ONT can be labor-intensive and present additional hardware costs.

SUMMARY

This disclosure is directed to devices and methods for facilitating the upgrade of ONTs in optical networks. An ONT may include a first transport engine and a second transport engine, thus making the ONT a "multi-mode" or "multi-transport" ONT. The first transport engine may comprise a legacy transport engine that converts data conforming to a first or legacy transport (e.g., ATM transport) to data corresponding to one or more services, such as a T1 service. The second transport engine may comprise a next generation transport engine that converts data conforming to a second or next generation transport (e.g., Ethernet transport) to the data corresponding to the particular service, such as the T1 service. That is, both of the transport engines may convert separate and distinct transports to data corresponding to a common type of service, such as T1 service.

The ONT may also be configurable to select one of the first and second transport engines. In some instances, a user, such as an administrator may interact, either directly or indirectly (e.g., remotely), with the ONT to configure the ONT to select one of the first and second transport engines. In some instances, the ONT may not be configured to select between the engines but instead select between signals generated, output or otherwise issued by the engines. In response to the configuration, the ONT employs the selected engine to deliver the service to the subscriber devices. In this manner, ONTs designed in accordance with the techniques described in this disclosure may be viewed as being "upgrade-resilient" in that the ONT may account for at least one change, upgrade, or technological advance that may in the future affect legacy transports.

The techniques described in this disclosure may provide a number of advantages. For example, because the first transport engine supports the legacy transport and the second transport engine supports the next generation transport, technicians need not visit each ONT of the optical network to replace legacy ONTs with next generation ONTs or otherwise upgrade the ONT to support the next generation transport protocol. Instead, a network administrator, technician, or some other user may remotely configure the ONT to select between one of the first and second transport engines by, for example, entering commands to a management interface presented by the ONT. Alternatively, the ONT may auto-sense or otherwise detect the transport used by the network and, based on the detected transport, select between the first and second transport engines. In some optical networks, this may eliminate up to thousands of truck rolls, thereby potentially speeding up and reducing costs associated with the upgrade. Moreover, the cost to a subscriber may be reduced in that the subscriber may not need to purchase the next generation ONT, but may use the same ONT previously purchased to receive services via the legacy transport.

In one embodiment, an optical network terminal that terminates a fiber link of an optical network comprises a first transport engine that converts data received over the optical network via a first transport into data corresponding to a service for one or more subscriber devices and a second transport engine that converts data received over the optical network via a second transport into the data corresponding to the service for the one or more subscriber devices. The optical network terminal is further selectively configurable to select one of the first and second transport engines.

In another embodiment, a method comprises converting, with a first transport engine of an optical network terminal, data received over the optical network via a first transport into data corresponding to a service for one or more subscriber devices and converting, with a second transport engine of the optical network terminal, data received over the optical network via a second transport into the data corresponding to the service for the one or more subscriber devices. The method further comprises selectively configuring the optical network terminal to select one of the first and second transport engines to convert the data received over the optical network.

In another embodiment, an optical network terminal that terminates a fiber link of an optical network comprises a first transport means for converting data received over the optical network via a first transport into data corresponding to a service for one or more subscriber devices and a second transport means for converting data received over the optical network via a second transport into the data corresponding to the service for the one or more subscriber devices. The optical network terminal is further selectively configurable to select one of the first and second transport means.

In another embodiment, an optical system comprises an optical network terminal that includes a first transport engine that converts data received over an optical network via a first transport into data corresponding to a service for one or more subscriber devices and a second transport engine that converts the data received over the optical network via a second transport into the data corresponding to the service for the one or more subscriber devices. The optical network terminal is further selectively configurable to select one of the first and second transport engines. The optical system further comprises a central office terminal that receives data corresponding to the service and transmits the data over the optical network via either the first or second transport, and one or more remote terminals that receive and forward the data transmitted via either the first or the second transport to the optical network terminal.

A computer-readable storage medium comprising instructions that cause a programmable processor to convert, with a first transport engine of an optical network terminal, data received over the optical network via a first transport into data corresponding to a service for one or more subscriber devices, and convert, with a second transport engine of the optical network terminal, data received over the optical network via a second transport into the data corresponding to the service for the one or more subscriber devices. The instruction further cause the processor to selectively configure the optical network terminal to select one of the first and second transport engines to convert the data received over the optical network.

The details of one or more embodiments are set forth in the accompanying drawings and the description below. Other features, objects, and advantages of this disclosure will be apparent from the description and drawings, and from the claims.

DETAILED DESCRIPTION

This disclosure is directed to devices and methods for facilitating the upgrade of ONTs in optical networks. The devices and methods of this disclosure may reduce, if not eliminate, the need to replace or upgrade an ONT to account for upgrades to the transport technology used in the optical network. An ONT may, for example, include multiple transport engines. Each transport engine may be configured to convert at least one of a plurality of different transports to data corresponding to one or more services. As a result, the ONTs of this disclosure may be referred to a "multi-mode" or "multi-transport" ONTs.

Figure 1:
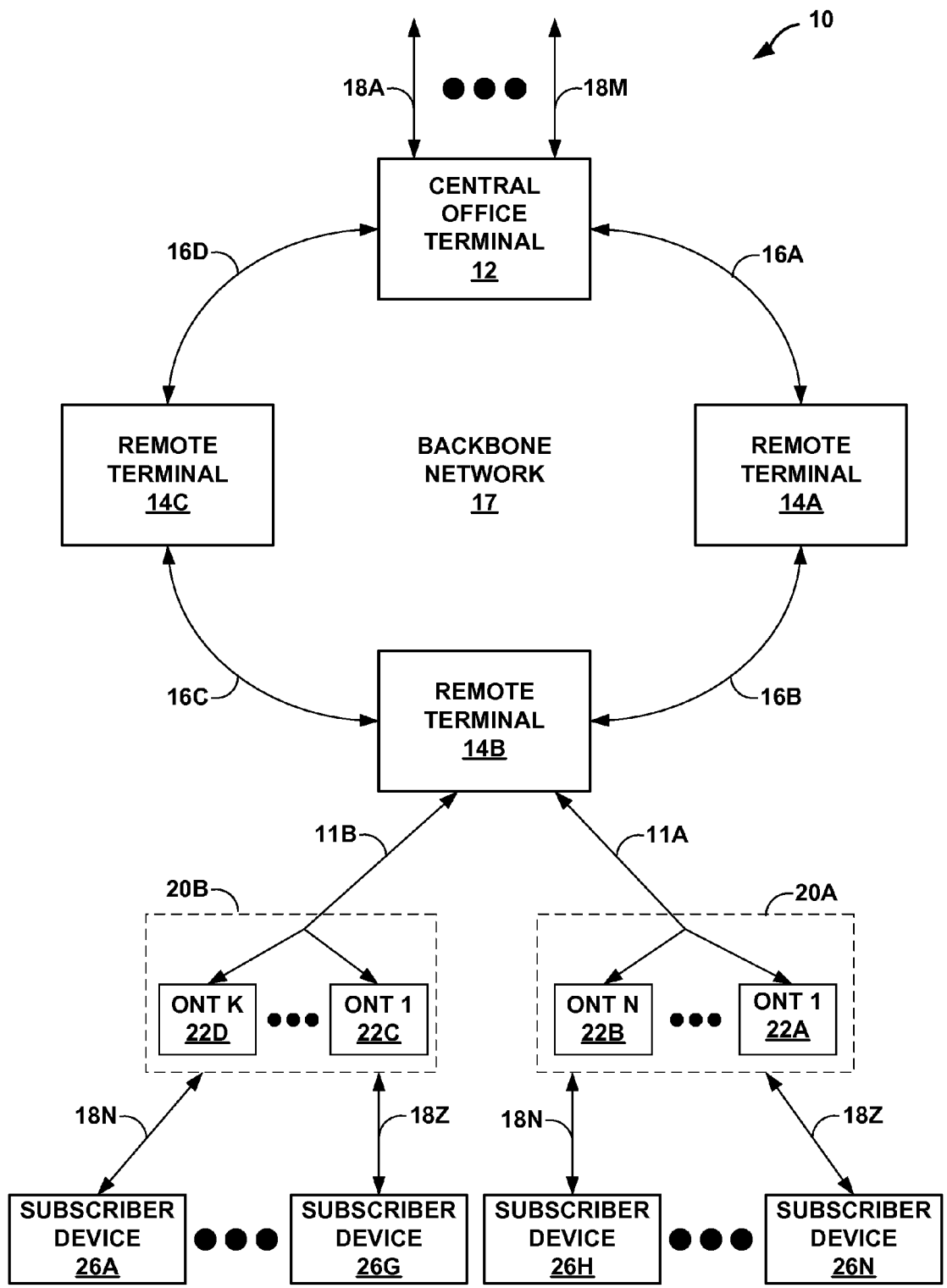
FIG. 1 is a block diagram illustrating an example optical network that delivers fiber to the premises (FTTP) services in accordance with upgrade-resilient techniques described in this disclosure.

FIG. 1 is a block diagram illustrating an example optical network 10 that delivers content or information to a number of subscribers via optical fiber links. As shown in FIG. 1, optical network 10 includes a plurality of terminals 12, 14A-14C. Terminals 12, 14A-14C may be coupled to one another via fiber links 16A-16D ("fiber links 16") to form a ring topology. Ring networks, such as that formed by terminals 12, 14A-14C, are generally considered resilient in that traffic may flow in either the clockwise or counter-clockwise direction around the ring such that traffic may be quickly re-routed to account for a fault in one of fiber links 16 or failure of one of terminals 12, 14A-14C. The ring network formed by terminals 12, 14A-14C and links 16 may be referred to herein as a "backbone network 17." Backbone network 17 may interconnect one or more computer networks together and may also interconnect these computer networks to a public network, such as the Internet. Backbone network 17 may, for example, comprise a wide area network (WAN) that serves a number of customer networks in geographically separate locations or a metropolitan area network (MAN) that serves densely populated metropolitan areas.

Within backbone network 17, central office terminal 12 represents a terminal capable of managing delivery of a wide variety of services, such as legacy services and next generation Internet Protocol (IP)/Ethernet services. Example legacy services include digital subscriber line (DSL) services, plain old telephone line services (POTS), Digital Signal 1 (DS1) services (also known as T1 or E1 services) or the like. Example next generation IP/Ethernet services include voice-over-IP (VoIP) services, digital video over IP, and IP-television (IPTV) services. For ease of illustration, it is assumed that central office terminal 12 manages delivery of a plurality of DS1 services, each of which may be commonly referred to as a "T1 service." Thus, central office terminal 12 receives a plurality of T1 services 18A-18M ("T1 services 18" or "T1 s 18"), although central office terminal 12 may receive any of the above listed service types as well as any other types of service typically managed by a central office terminal of an optical network, such as optical network 10. A T1 service may, for example, be a dedicated T1 line that is leased or owned by a subscriber, such as a business or enterprise.

Typically, a business or enterprise leases the T1 line or a plurality of T1 lines from one or, in the instance of multiple T1 lines, more service providers. The service provider therefore provides a T1 service to the subscriber, where the T1 service generally denotes a specific allocation of dedicated bandwidth. A T1 service generally provides approximately 1.536 megabits per second of dedicated (or unshared) bandwidth to the subscriber in both the upstream and downstream directions, as T1 is considered a full-duplex circuit. In this instance, central office terminal 12 may interface with a plurality of T1 lines and process data corresponding to each of T1 services 18 to route the data or, more generally, T1 services 18 to a given subscriber, which are represented in FIG. 1 as subscriber devices 26A-26N ("subscriber devices 26").

The business or enterprise may own one or more of subscriber devices 26, which may comprise one of a public branch exchange (PBX) device, a router, or any other device capable of interfacing with a service, such as T1 services 18. The business may employ these devices 26 to facilitate the transfer of any type of data, including voice data (by employing a PBX device), network data (by employing a router), or video data. Subscriber devices 26 may process the data corresponding to T1 services 18 and deliver all or portions of the data to end-user devices, such as telephones, laptops, workstations, servers, mobile or cellular telephones, personal digital assistants (PDAs), televisions or other display devices, or any other device capable of transmitting and receiving data corresponding to the service.

In addition to originating services as described above, central office terminal 12 may also provide an interface to backbone network 17 in a manner substantially similar to that described below with respect to remote terminals 14A-14C. Remote terminals 14A-14C ("remote terminals 14") of backbone network 17 each represent a terminal that may be capable of delivering any of the above listed services, either to another one of remote terminals 14, central office terminal 12, to one or more ONTs (e.g., ONTs 22A-22D), or a combination thereof. Remote terminals 14 may therefore provide an interface to backbone network 17. Remote terminal 14B, for example, couples to each of ONT groups 20A, 20B ("ONT groups 20") via optical fiber links 11A, 11B, respectively, to facilitate the transfer of services to ONTs 22 of each of respective groups 20A, 20B by way of backbone network 17. In this manner, remote terminal 14B and ONTs 22 terminate opposite ends of fiber links 11A, 11B respectively. That is, ONTs 22 couple to remote terminal 14B, where remote terminal 14B may facilitate the transfer of services between ONTs 22 and backbone network 17.

Either or both of central office terminal 12 and remote terminals 14 may include one or more optical line terminals (OLTs) that terminates optical fiber links, such as optical fiber links 11A, 11B, 16A-16D. In each case, the OLTs receives data associated with a service, such as one or more of T1 services 18, and distributes the data or information along optical fiber links 11A, 11B, 16A-16B in the form of optical signals to ONT groups 20A and 20B of ONTs 22. OLT 12 may be located near or far from ONTs 22. However, OLT 12 is typically located in a telecommunication company central office, such as central office terminal 12.

Although not shown in exacting detail in FIG. 1 for ease of illustration purposes, each of ONT groups 20 may comprise a number of fiber links similar to fiber links 11A, 11B that are split off of fiber links 11A, 11B using passive optical splitters. ONT group 20A includes ONTs 1-N, designated in FIG. 1 as "ONT 1 22A" and "ONT N 22B" to indicate a plurality of ONTs 22. ONT group 20B includes ONTs 1-K, designated in FIG. 1 as "ONT 1 22C" and "ONT K 22D" to suggest another plurality of ONTs 22. Each of ONT groups 20 may comprise any number of ONTs 22, and the above designations should not be construed as requiring a particular number of ONTs or that each of ONT groups 20 include the same number of ONTs 22. Instead, ONT group 20A may include a first plurality of ONTs 22 and ONT group 20B may include a second plurality of ONTs 22, each of the first and second plurality of ONTs 22 being the same or different in number.

Each one of the plurality of ONT 22 of each of ONT groups 20 terminates a fiber link split off from fiber links 11A, 11B using the above described passive optical splitters, e.g., for downstream communication. Each of ONT groups 20 may also include passive optical combiners to perform the inverse function of the passive optical splitters, thereby combining a plurality of fiber links into single fiber links 11A, 11B, e.g., for upstream communication. Each of ONT groups 20 are shown in FIG. 1 without passive optical splitters and optical combiners for ease of illustration. Moreover, while shown as comprising only two ONT groups 20, optical network 10 may comprise additional ONT groups 20 that interface with backbone network 17 via remote terminals 14A-14C and central office terminal 12. Additionally, one or more ONT groups 20 may couple to other remote terminals, e.g., remote terminal 14A and/or 14C. As a result, the techniques described in this disclosure should not be limited to the exemplary embodiment described in FIG. 1.

As shown in FIG. 1, each of ONT groups 20 represents part of a passive optical network (PON) that passively splits a single fiber link 11A, 11B among multiple ONTs 22, respectively. Thus, each of ONT groups 20 may represent a network that operates in accordance with a PON standard, such as a gigabit PON (GPON) as defined by the international telecommunication union (ITU) standard G.984 (ITU G.984), as well as any other type of PON, such as a broadband PON (BPON) as defined in standard ITU G.983, an Ethernet PON (EPON) as defined in standard IEEE 802.3, and future PONs under development by organizations such as the Full Service Access Network (FSAN) Group.

However, ONT groups 20 may, in the alternative, each comprise an active Ethernet network, which can be differentiated from a PON in that an active Ethernet network actively routes data between endpoints, e.g., ONTs 22 and remote terminal 14B, while PONs remain passive and do not route data between endpoints, instead transmitting data to each endpoint regardless of the address or other identifier associated with the endpoint. An active Ethernet network also differs from a PON in that the active Ethernet network provides point-to-point connectivity. In other words, instead of employing passive optical splitters and combiners that passively split and combine optical links 11A, 11B, one or more powered components may be used to actively route the optical network traffic. For example, each of the plurality of ONTs 22 may be coupled to an intermediate optical switch (not shown) or remote terminal 14B via a separate optical link similar to optical link 11A or 11B. The techniques described in this disclosure therefore are not limited to passive optical networks, but may be applicable to active or non-passive networks, such as an active Ethernet network. In some instances, one of ONT group 20s may comprise a PON, while another one of ONT groups 20 comprises an active Ethernet network.

To communicate data downstream (e.g., from remote terminal 14B to ONT groups 20), remote terminal 14B may communicate with each of ONT groups 20 in accordance with one of the above described standards by which each of ONT groups 20 communicates information, such as voice, video and data units. For example, remote terminal 14B may provide services in accordance with one of the above-listed PON standards to ONT group 20A while also providing services in accordance with the above listed active Ethernet standard to a different ONT group 20B.

Backbone network 17 may use any of a variety of transports to transfer information around the ring network formed by terminals 12, 14A-14C and to/from ONT 22. In one example, backbone network 17 may comprise a network that implements SONET and that transports the information using a legacy transport, such as an ATM transport. In other words, the information conforms to ATM protocol. The ATM transport may inefficiently utilize the bandwidth of optical fiber links 16. Therefore, it may be desirable to upgrade backbone network 17 to transport information in accordance with a transport mechanism that better utilizes the bandwidth of the underlying fiber links of backbone network 17. For example, a service provider may upgrade backbone network 17 to utilize a next generation transport, such as an Ethernet transport. After upgrading backbone network 17 in this manner, the information is sent over backbone network 17 in accordance with the next generation, e.g., Ethernet, protocol. Further, the service provider may upgrade ONT groups 20 from a passive optical network (PON) to an active network to further take advantage of the upgrade from the ATM to the Ethernet transport in the backbone networks.

Typically, the service provider may first upgrade backbone network 17 to take advantage of the improved efficiency, in terms of bandwidth, provided by the Ethernet transport. The service provider may also upgrade to the Ethernet transport because the hardware and/or software to support this Ethernet transport may cost less than comparable hardware and/or software to support the ATM transport, as a result of economies of scale due to wide use of Ethernet transports in IP networks. Moreover, the service provider may upgrade to the Ethernet transport because maintenance costs associated with Ethernet networks are much lower, especially over the long-term. That is, managing an Ethernet/IP network, when compared to managing a SONET network, is much easier and therefore requires less technical support, which is often costly and may result in delays that interrupt service.

However, the service provider may not immediately upgrade ONT groups 20 from a PON network, which supports both Ethernet and ATM transports, to an active Ethernet network, which only supports the Ethernet transport. In particular, costs associated with actively powered components to route the traffic and the cost of laying fiber in the point-to-point configuration discussed above may be an obstacle to immediate transition to Ethernet transports. At some later point, the service provider may lay the additional fiber required for the point-to-point configuration and upgrade from the PON standard to the active Ethernet standard to further benefit from bandwidth and cost savings associated with Ethernet transport.

While increasing the bandwidth of backbone network 17, reducing maintenance costs, and possibly reducing overall costs of equipment, upgrading backbone network 17 may require replacing or upgrading the ONTs responsible for handling the ATM or other legacy transport. To replace or upgrade an ONT, a technician typically visits the subscriber premises, removes the legacy ONT and replaces the legacy ONT with the next generation ONT capable of handling the next generation transport, e.g., Ethernet transport. This "truck roll," as it is commonly referred, is not only time consuming but also expensive because there may be potentially thousands of ONTs located in geographically distant locations that the technician must visit prior to or immediately after upgrading backbone network 17 to the next generation transport. In addition to labor costs associated with replacement or upgrade, a new ONT may present significant hardware costs.

In accordance with the techniques of this disclosure, one or more of ONTs 22 may be selectively configurable to handle information received via two or more transport mechanisms. In other words, one or more of ONTs 22 may be selectively configurable to handle information received in accordance with two or more transport protocols. For example, ONTs 22 may be selectively configurable to handle information received using a legacy transport and a next generation transport. In other words, ONTs 22 may support incoming data that conforms to legacy transport protocols (such as ATM) and next generation protocols (such as Ethernet). As an illustration, ONTs 22 may be selectively configurable to support the ATM (e.g., legacy) transport and the Ethernet (e.g., next generation) transport. To this end, each of ONTs 22 may include a first transport engine and a second transport engine. The first transport engine may comprise a legacy transport engine that converts a first or legacy transport to a particular one of the above listed services, and converts the particular one of the above listed services to the first or legacy transport. The second transport engine may comprise a next generation transport engine that converts a second or next generation transport to the particular service and converts the particular service to the second or next generation transport. That is, the first and second transport engines may convert separate and distinct transports to the same service, such as a T1 service, and vice versa. ONTs 22 may be selectively configurable to select one of the first and second transport engines.

In some instances, an administrator may interact with a provisioning system (not shown in FIG. 1), or any other type of system designed to remotely and dynamically configure network devices, to configure ONTs 22 to selectively activate one of the first and second transport engines or, in some instances, selects a signal generated by one of the first and second transport engines for use in generating data corresponding to a service, such as T1 service. Alternatively, ONTs 22 may auto-sense or otherwise detects the transport used by the network and, based on the detected transport, selectively configure ONTs 22. ONTs 22 may, for example, monitor the outputs of the first and second transport engines and select the coherent output, thereby auto-detecting the transport used by the network. After selective configuration of ONTs 22, ONTs 22 may employ the selected engine (or selected signal) to deliver services 18N-18Z to subscriber devices 26A-26N ("subscriber devices 26").

For example, the legacy transport engine of each of ONTs 22 may comprise an asynchronous transport mode (ATM) transport engine that converts ATM cells into a legacy service for subscriber devices 26, e.g., one of the above listed services. As described above, backbone network 17 may, in some instances, comprise a network that implements synchronous optical networking (SONET) and supports an ATM transport.

In accordance with this configuration, central office terminal 12 may receive and convert data corresponding to T1 services 18A-18M into ATM cells. Central office terminal 12 may include a segmentation and reassembly (SAR) engine to convert the T1 data into ATM cells. The SAR engine may operate in accordance with an ATM adaption layer (AAL), such as AAL1. Although not shown in FIG. 1, central office terminal 12 may employ a transport engine substantially similar to the legacy transport engine to segment T1s 18A-18M into ATM cells. Central office terminal 12 then transmits the ATM cells via backbone network 17, whereupon remote terminal 14B may remove any ATM cells destined for ONT groups 20. Remote terminal 14B forwards to ONT groups 20 those ATM cells destined for one or the other of ONT groups 20. ONTs 22 receive the ATM cells and employ the ATM transport engine, e.g., using a segmentation and reassembly (SAR) engine in accordance with an ATM adaptation layer (AAL), to reassemble those ATM cells into the native T1 services, which are represented as T1s 18N-18Z.

At some point, a user, such as a network administrator, may determine to upgrade backbone network 17, as described above, to support a next generation transport, such as an Ethernet transport. Commonly, the next generation transport may more efficiently utilize the bandwidth of fiber links 16 than the legacy transport, such as the ATM transport. The next generation transport engine of ONTs 22 may therefore comprise a transport engine that converts Ethernet frames or packets back into data corresponding to the T1 service for subscriber devices 26. The conversion of either ATM cells or Ethernet frames or packets may involve a number of steps and is typically protocol specific, but generally involves unpacking the cells or frames into a stream of data, compensating for jitter or other interference, generating T1 frames, and transmitting the T1 frames via a T1 line. More detail concerning the conversion of ATM cells and Ethernet frames to T1 service is provided below with respect to FIGS. 3A and 3B. Furthermore, as described above, the network administrator may upgrade one or more of ONT groups 20 from a PON to an active Ethernet network, which does not support the ATM transport.

While technicians or other network specialists upgrade backbone network 17 and/or ONT groups 20 to support the next generation transport, e.g., the Ethernet transport, an administrator may interact with a provisioning system or any other management system to remotely and dynamically configure ONTs 22 to select the next generation transport engine. Upon upgrading backbone network 17, central office terminal 12 may continue to receive data corresponding to T1 services 18A-18M, but may convert the data corresponding to T1 services 18A-18M into Ethernet packets, e.g., in accordance with the pseudo-wire emulation edge-to-edge (PWE3) protocol. In other words, after the upgrade to backbone network 17, central office terminal 12 may convert the data corresponding to T1 services into Ethernet packets instead of ATM cells. Central office terminal 12 then forwards those packets over backbone network 17 via the PWE3 protocol to emulate delivery of T1 services over optical network 10. Remote terminal 14B may receive the Ethernet packets and forward those packets destined for ONTs 22 via respective ones of optical fiber links 11A, 11B. ONTs 22 may employ the second transport engine to convert the Ethernet packets back into the data corresponding to the T1 services again in accordance with the PWE3 protocol. As above, the native T1 services are represented in FIG. 1 by T1 services 18N-18Z.

Similar to T1 services 18A-18M above, T1 services 18N-18Z are merely one example of services that ONT 22 may provide to subscriber devices 26. Generally, central office terminal 12 may receive any number of services 18A-18M, convert data corresponding to those services via one or more AALs to ATM cells or Ethernet packets via the PWE3 protocol, and forward the ATM cells via backbone network 17 to ONTs 22, as described above. ONTs 22 may employ the first transport engine to reassemble the data corresponding to those services transported as ATM cells into the native services (e.g., the service received before transmission across backbone network 17, which in the example of FIG. 1, includes T1 services 18), and employ the second transport engine to reassemble the data corresponding to those services transported as PWE3 packets into the native services (e.g., T1 services 18). Thus, the techniques described in this disclosure should not be limited to a single service, but may include a plurality of services 18 where one or more of services 18 may differ substantially from other services 18.

Because the first transport engine supports the legacy transport and the second transport engine supports the next generation transport, ONTs 22 may be referred to as "upgrade-resilient" in that ONTs 22 account for at least one change, upgrade, or technological advance that may in the future affect legacy transports. Additionally, as an administrator may remotely configure ONTs 22 using, for example, a provisioning system (not shown in FIG. 1), ONTs 22 may reduce if not eliminate what is commonly referred to in the industry as a "truck roll" typically required to upgrade ONTs to support the next generation transport. Moreover, Ethernet backbone networks 17 are generally more cost effective as Ethernet devices often cost less than associated devices that support the ATM transport.

Truck rolls refer to instances where a technician or other service representative physically visits the subscriber premises to correct issues that cannot be resolved remotely. These truck rolls are typically costly due to the time associated with traveling to each site. In instances where the transport is upgraded from a legacy transport, such as an asynchronous transport mode (ATM) transport, to a next generation transport, such as an Ethernet transport, truck rolls may be required to remove hundreds or thousands, if not more, legacy ONTs and replace these legacy ONTs with next generation ONTs. ONTs 22, however, include the legacy transport engine and the next generation transport engine thereby accounting for potential future upgrades to backbone network 17 and possibly the optical network type of the optical network servicing ONT groups 20 that may affect the legacy transport. By including both the legacy and next generation transport engines, ONTs 22 may reduce if not eliminate truck rolls plus additional hardware costs associated with replacing legacy ONTs with next generation ONTs and the high costs associated with such truck rolls.

Figure 2:
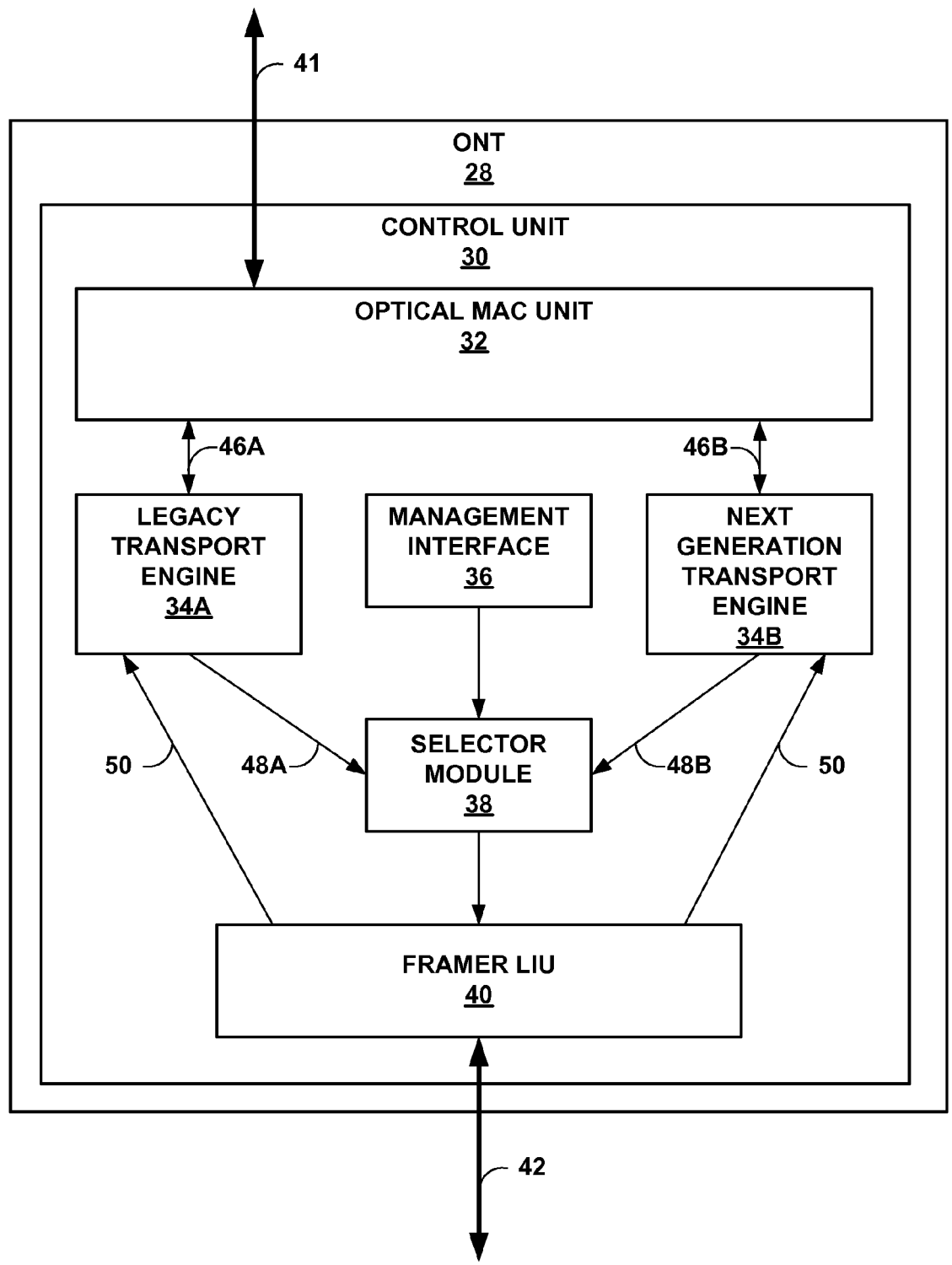
FIG. 2 is a block diagram illustrating an example ONT that implements upgrade-resilient techniques described in this disclosure.

FIG. 2 is a block diagram illustrating an example ONT 28 that implements the techniques described in this disclosure. As will be described in detail below, ONT 28 is selectively configurable to select one of a first (e.g., legacy) transport engine 34A and a second (e.g., next generation) transport engine 34B, thus making ONT 28 resilient to upgrades of backbone network 17 (FIG. 1) or switching of optical network protocols that affect the transport mechanism used to transport the services. Thus, although described with respect to ONT 28, ONTs 22 may comprise similar components, modules and engines to perform the upgrade-resilient techniques as described in this disclosure.

ONT 28 may be mounted externally to a wall or other structure of the subscriber premises, e.g., business or enterprise, and may be powered either by an uninterruptible power source (UPS) or battery. ONT 28 may output data corresponding to a service via a service interface (not shown), such that a cable or other connective medium may be coupled to the ONT 28 and routed into the structure of the subscriber to couple with the subscriber devices, such as subscriber devices 26. In one example, ONT 28 may connect with subscriber devices 26 via a T1 line.

ONT 28 includes a control unit 30 that represents hardware, software, or a combination of both to implement the techniques described in this disclosure. That is, control unit 30 and its components, including transport engines 34A, 34B may, for example, comprise any combination of one or more processors, one or more field programmable gate arrays (FPGAs), one or more application specific integrated circuits (ASICs), and one or more application specific standard products (ASSPs). Control unit 30 may also comprise memory, both static (e.g., hard drives or magnetic drives, optical drives, FLASH memory, EPROM, EEPROM, etc.) and dynamic (e.g., RAM, DRAM, SRAM, etc.), or any other computer readable storage medium capable of storing instructions that cause the one or more processors to perform the techniques described in this disclosure. Thus, control unit 30 may represent any combination of hardware and/or software to support the functions attributed to the components described below, and the techniques should not be strictly limited to any particular embodiment described below. Depiction of different features as modules/units is intended to highlight different functional aspects of the devices illustrated and does not necessarily imply that such modules/units must be realized by separate hardware or software components. Rather, functionality associated with one or more modules/units may be integrated within common or separate hardware or software components.

As shown in FIG. 2, control unit 30 may include a variety of components, modules and engines, such as an optical media access control unit 32 ("optical MAC unit 32"), a first or legacy transport engine 34A, a second or next generation transport engine 34B, a management interface 36, a selector module 38, and a framer line interface unit 40 ("framer LIU 40"). Optical MAC unit 32 represents a module that implements at least a portion of the data link layer, or layer 2, of the open systems interconnection (OSI) model. Optical MAC unit 32 may provide addressing and channel access control mechanisms that enable several subscriber devices, e.g., subscriber devices 26, to share a given fiber link, such as fiber link 41. Optical MAC unit 32 may further convert physical layer signals to distinct data units, such as ATM cells or Ethernet frames encapsulated in the PWE3 protocol, in the downstream direction, as well as, convert these distinct data units to the physical layer signals in the upstream direction.

Legacy transport engine 34A, as described above, represents a transport engine that supports a legacy transport, such as an ATM transport. Legacy transport engine 34A may convert the downstream legacy data units to native services and native services to legacy units in the upstream direction. In the case of ATM for example, legacy transport engine 34A may comprise an ATM transport engine that converts ATM cells into a digital representation of a T1 service in accordance with an ATM adaption layer (AAL). As described above, native services refer to the services received before transmission across backbone network 17. For example, legacy transport engine 34A may receive ATM cells destined for subscriber devices, such as subscriber devices 26 (FIG. 1), and convert these downstream ATM cells into data corresponding to native T1 services, such as T1 services 18N-18Z (FIG. 1). Looking upstream or from subscriber devices 26 to backbone network 17, legacy transport engine 34A may convert data corresponding to the upstream T1 services received from subscriber devices 26, such as T1 services 18N-18Z, to ATM cells.

Likewise, next generation transport engine 34B represents a transport engine that supports a next generation transport, such as an Ethernet transport. Considering downstream functionality, next generation transport engine 34B may receive Ethernet frames or packets encapsulated by the PWE3 protocol and convert these frames to data corresponding to native T1 services, such as T1 services 18N-18Z. Thus, next generation transport engine 34B may comprise an Ethernet transport engine that converts Ethernet packets into the digital representation of the T1 service in accordance with a pseudo-wire emulation edge-to-edge (PWE3) protocol. Looking upstream, next generation transport engine 34B may receive data corresponding to T1 services from subscriber devices 26 and convert those services into Ethernet packets encapsulated by the PWE3 protocol. ONT 28 may then transmit the Ethernet packets upstream to remote terminal 14B.

Management interface 36 represents an interface by which an administrator, via a remote provisioning system, a local terminal, or any other interface mechanism, may configure ONT 28. In particular, management interface 36 presents the interface such that the administrator may selectively configure ONT 28 to select between one of transport engines 34A, 34B ("transport engines 34"). Typically, an administrator interacts with a provisioning system, which in turn interacts with management interface 36 to selectively configure ONT 28. Management interface 36 therefore provides an interface by which an administrator may remotely and dynamically configure ONT 28 such that ONT 28 employs either one of transport engines 34. In some instances, ONT 28 may be selectively configured via management interface 36 such that ONT 28 selects between outputs generated by transport engines 34. In other words, the each of transport engines 34 converts the data received over the optical network via the transport into respective output data 48A, 48B.

Selector module 38 represents a module for selecting between the outputs generated by engines 34, i.e., output data 48, in the downstream direction. Continuing the above example, selector module 38 may receive outputs from either or both of transport engines 34 and select which of the outputs to forward downstream to subscriber devices 26. Selector module 38 may, for example, comprise a multiplexer to select between each of the outputs from transport engines 34. Selector module 38 may comprise any other type of hardware, software, or both for selecting between two or more outputs or signals. Although shown as residing separate from engines 34, selector module 38 may be included within either one of transport engines 34. Thus, selector module 38, as shown in FIG. 2, is presented merely for exemplary purposes and should not be limited to the techniques described in this disclosure.

In the example of FIG. 2, framer LIU 40 represents a module for framing data corresponding to the services for transmission over a line 42, such as a copper wire, a coaxial cable, or a twisted-pair cable. Framer LIU 40 may frame, for example, data corresponding to T1 services according to a super frame (SF) framing scheme or an extended super frame (ESF) framing scheme. "Framing" refers to a technique for synchronizing frames, e.g., 193 bits in the case of a T1 frame, to identify delivery timeslots on the line channel. Framing ensures that each device, e.g., ONT 28 and subscriber devices 26, may identify the start and end of a particular portion of data corresponding to the T1 service. Framer LIU 40 may transmit data corresponding to T1 services via line 42 to one or more subscriber devices, such as subscriber devices 26. Framer LIU 40 may be configured to generate frames of different sizes for services other than T1 services.

Although not shown in FIG. 2, ONT 28 may include optical-to-electrical (O/E) and electrical-to-optical (E/O) converters that convert optical signals received as downstream transmissions via fiber link 41 to electrical signals, and convert electrical signals, including electrical received from subscriber devices via line 42, to optical signals for upstream transmission via fiber link 41. The O/E converter terminates the optical signals received via optical fiber link 41, and produces physical (PHY) layer signals. Optical MAC unit 32 may convert the PHY signals into the currently deployed transport. For example, Optical MAC unit 32 may convert the PHY signal into either of an ATM transport or Ethernet transport. If an ATM transport is deployed in backbone network 17, for example, optical MAC unit 32 generates ATM transport 46A. If an Ethernet transport is deployed in backbone network 17, however, optical MAC unit 32 generates Ethernet transport 46B.

In accordance with the techniques described in this disclosure, an administrator may interact with management interface 36 to selectively configure control unit 30 of ONT 28 such that control unit 30 selects one of output data 48A, 48B respectively generated by engines 34 as a result of converting transports 46A, 46B ("transports 46"). Alternatively, the administrator may interact with management interface 36 to activate only one of the transport engines 34A, 34B. In this case, selector module 38 may receive only one set of output data 48 from the activated transport engine 34. Activating only the necessary transport engine may reduce the amount of power consumed by ONT 28. The administrator, as described above, may not directly interact with management interface 36, but may instead interact with a provisioning system, which in turn interacts with management interface 36 to selectively configure ONT 28 in the above described manner. In either event, management interface 36 may receive commands specifying changes to the current configuration of ONT 28 and based on the command apply those changes to selectively configure ONT 28 in the manner described in this disclosure.

For example, management interface 36 may support a provisioning protocol or language, such as an ONT Management Control Interface (OMCI) language. OMCI may support provisioning of a 'network type' parameter, which may determine whether the channel is ATM or Ethernet based. Alternatively, in an active Ethernet network, management interface 36 may support a simple network protocol (SNMP), which may similarly support provisioning of a parameter to select between the legacy and next generation network transports. As another example, management interface 36, for an active Ethernet network, may support the digital subscriber line (DSL) forum created TR-069 customer premise equipment (CPE) wide area network (WAN) management protocol and any of the extensions to TR-069 (e.g., TR-089, TR-104, TR-106, TR-110, TR-111, TR-135, TR-140, and TR-142), which may likewise support provisioning of a parameter, as above, to select between the legacy and next generation transports. Thus, management interface 36 may include these, as well as, any other protocol modules required to receive the command or other input to remotely configure ONT 28.

In some embodiments, ONT 28 may auto-sense or otherwise detect the transport used by the network and, based on the detected transport, selectively configure itself. ONT 28 may, for example, monitor the outputs of the first and second transport engines and selector module 38 selects the coherent output. In this manner, ONT 28 thereby automatically detects the transport used by the network and configures itself. In some instances, ONT 28 may even deactivate the one of the transport engines that outputs incoherent data to conserve power resources of ONT 28.

In response to receiving a command or other input that configures ONT 28, or automatically self-configuring ONT 28, to select one of output data 48 generated by engines 34, management interface 36 may update selector module 38 such that selector module 38 selects the one of output data 48 identified in the command or other input. For example, if prior to the command or other input, selector module 38 forwards output data 48A to framer LIU 40, after the command or other input, selector module 38 may forward output data 48B to framer LIU 40 in the downstream direction. In this manner, ONT 28 is selectively configured to utilize the other transport engine that is designed to handle the updated network transport.

In some embodiments, ONT 28 may further be selectively configured to utilize one of transport engines 34 to output data corresponding to a first one of T1 services and another one of transport engines 34 to output data corresponding to a different or second one of the T1 services. In other words, ONT 28 may be selectively configurable on a per-service basis to utilize either of transport engines 34 for a given one of the services. For example, ONT 28 may be configured to employ legacy transport engine 34A for a first one of a plurality of T1 services, e.g., one of T1 services 18 of FIG. 1, and next generation transport engine 34B for a second one of T1 services 18. Selector module 58 may then select between output data 48 depending on which of T1 services 18 is currently being converted. Thus, ONT 28 is selectively configurable to select one of the first and second transport engines 34 on a per-service basis such that ONT 28 selects first transport engine 34A, for example, to convert data received over the optical network via the first transport into data corresponding to a first one of the services for one or more of the subscriber devices and selects second transport engine 34B to convert data received over the optical network via the second transport into data corresponding to a second one of the service for the one or more subscriber devices.

In the upstream direction, framer LIU 40 may receive data corresponding to a service via line 42 and forwards service 50 to both of engines 34. As described below in reference to FIGS. 3A, 3B, each of engines 34 segments service 50 and outputs respective data corresponding to a service in the form of transports 46. Although not shown, optical MAC unit 32 may comprise a selector module similar to selector module 38 to select between transports 46 for delivery via fiber link 41. In this manner, ONT 28 may include both of transport engines 34 to become more upgrade-resilient and thereby possibly reduce if not eliminate costly truck rolls to upgrade and/or replace ONTs. Moreover, ONT 28 may facilitate conversion from a legacy to a next generation transport within an optical network, such as optical network 10, by enabling remote configuration to quickly adapt to the new or next generation transport.

Figure 3A:
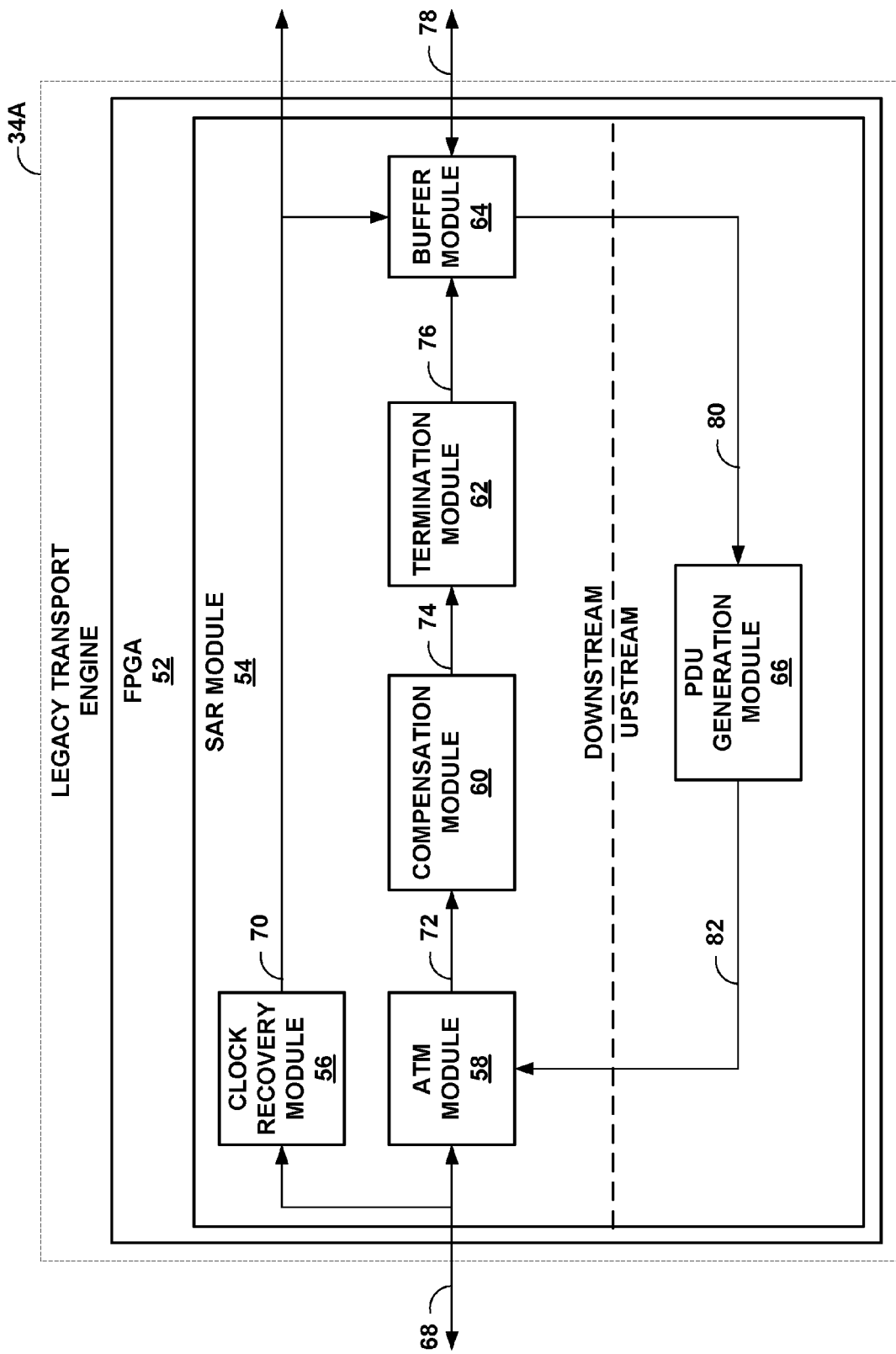
FIGS. 3A and 3B are block diagrams illustrating respective legacy transport engine and next generation transport engine of FIG. 2 in more detail.
Figure 3B:
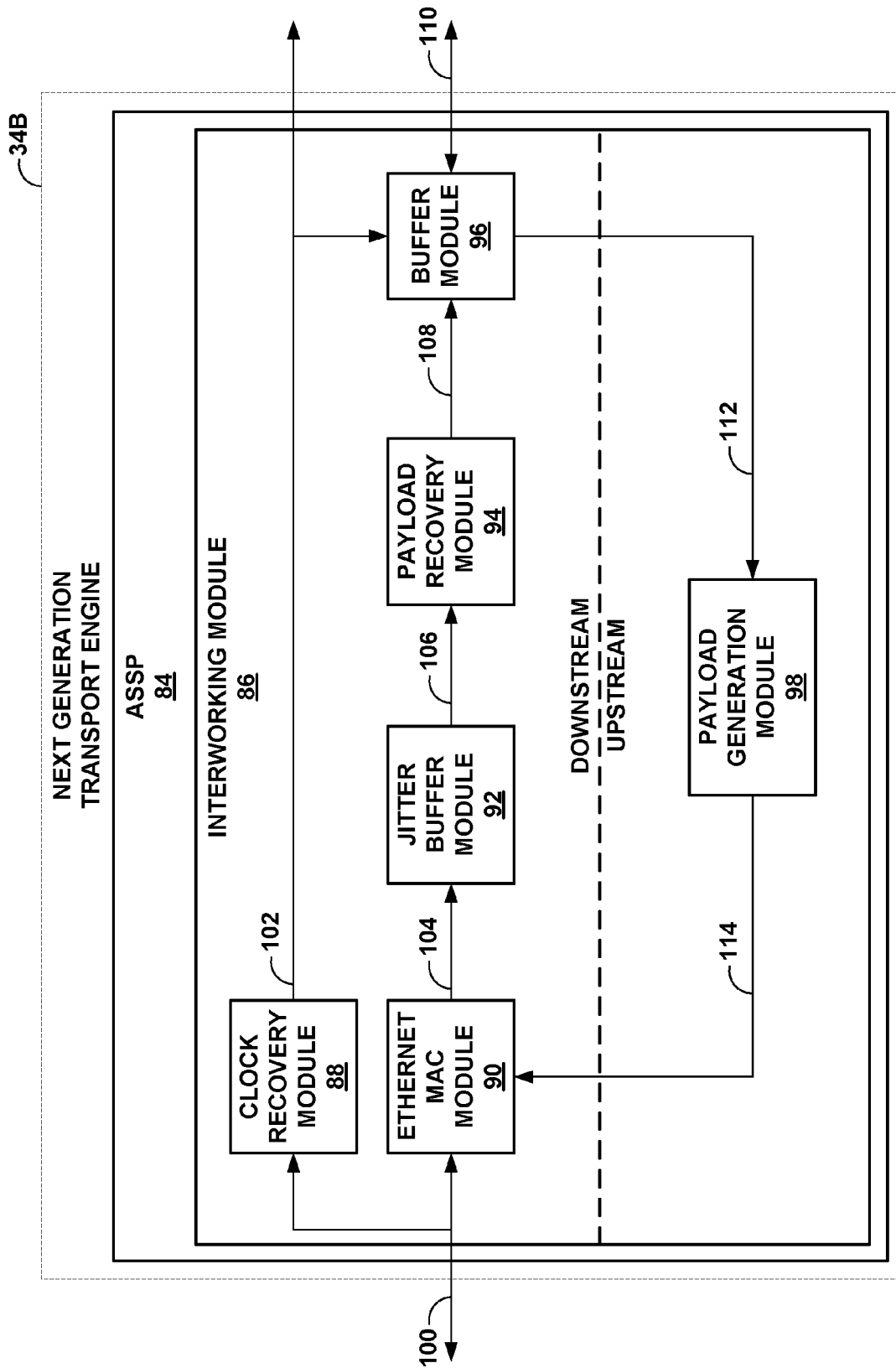

FIGS. 3A and 3B are block diagrams illustrating legacy transport engine 34A and next generation transport engine 34B, respectively, of FIG. 2 in more detail. As shown in FIG. 3A, legacy transport engine 34A may be formed by a field programmable gate array 52 ("FPGA 52"). Alternatively, other suitable logic circuitry may be used to form legacy transport engine 34A. FPGA 52 comprises a segmentation and reassembly (SAR) module 54, which FPGA 52 may be programmed to implement as a dedicated hardware function. SAR module 54 may conform to an AAL, such as AAL1. In other words, SAR module 54 may perform operations in accordance with an AAL. SAR module 54 represents a module that segments upstream services into ATM cells and reassembles downstream ATM cells back into data corresponding to the native services (e.g., the service as received by the central office terminal) in accordance with the AAL.

Various AALs are defined which describe the process by which SAR module 54 segments services into ATM cells and reassembles ATM cells into the services. AAL1, for example, defines the operations for emulating T1 with the ATM transport. That is, AAL1 defines the processes by which SAR module 54 segments data corresponding to the T1 services into ATM cells and reassembles ATM cells into data corresponding to the T1 services. As AAL1 supports a constant bit rate and synchronous, connection oriented traffic, AAL1 represents a method for providing both circuit emulation services and unstructured T1 across a synchronous ATM network. In total four AALs are defined (AAL1, AAL2, AAL3/4 and AAL 5) to emulate a variety of services. Although the techniques described in this disclosure are described with respect to AAL1, SAR module 54 may conform to any combination of AALs 1, 2, 3/4, and 5 to emulate other services or signals over ATM. The techniques should not, therefore, be limited to the described examples.

In the example of FIG. 3A, SAR module 54 includes a clock recovery module 56, an ATM module 58, a compensation module 60, a termination module 62, a buffer module 64, and a protocol data unit (PDU) generation module 66 ("PDU generation module 66"). As shown in FIG. 3A, SAR module 54 may be divided logically into two paths, a downstream path and an upstream path, the division of which are represented by the horizontal dashed line through SAR module 54. Modules 56-64 represent the downstream path, while modules 58, 64 and 66 represent the upstream path. While modules 58 and 64 operate in both the upstream and downstream paths, these modules 58, 64 are shown in FIG. 3A to reside only in the downstream path for purposes of illustration.

Clock recovery module 56 represents a module that receives downstream ATM cells 68 and recovers a clock value from cells 68. Clock recovery module 56 may recover a clock value 70 in a variety of ways, two of which are described in International Telecommunication Union (ITU) standard ITU-T I.363.1. Briefly, one method is referred to as an adaptive clock method and the other method is referred to as a synchronous residual time stamp method. The adaptive clock method complies with jitter requirements but not wander requirements, as recommended in G.823/G.824. The synchronous residual time stamp method may comply with both of these requirements as recommended in G.823/G.824. Clock recovery module 56 may recover clock value 70 so that synchronous services, such as T1 services, can be accurately emulated over ATM and typically implements the synchronous residual time stamp method in order to recover clock value 70. In other words, a framer LIU, such as framer LIU 40 of FIG. 2, may base the framing of T1 services, such as T1s 18N-18Z of FIG. 1, on clock value 70 output by clock recovery module 56.

ATM module 58 also represents a module that receives downstream ATM cells 68. ATM module 58 may further receive protocol data units (PDUs), however, from PDU generation module 66 of the upstream path. ATM module 58 acts in the downstream path to un-package protocol data units (PDUs) and control data from ATM cells 68. The PDUs and control data are represented as data 72 in FIG. 3A. PDUs may correspond with the payload of the ATM cells. The control data may include headers that define a number of different values, such as a sequence count and a cyclic redundancy check (CRC) value. ATM module 58 may verify the integrity of ATM cells 68 based on the CRC value. Based on this sequence count, SAR module 34A may reassemble ATM cells 68 back into data that corresponds to the native services. In the upstream path, ATM module 58 appends control information to PDUs, typically in the form of headers to the PDUs, to generate ATM cells 68 for transmission upstream.

Compensation module 60 represents a module that receives data 72 and reorders data 72 or otherwise compensates for jitter and wander that may have occurred during the transmission of downstream ATM cells 68. Compensation module 60 may, for example, utilize a sequence count of data 72 to ensure that data 72 is in the proper order. In other words, compensation module 60 may rearrange or reorder data 72 based on the sequence count as well as other control information present in data 72. Compensation module 60, after accounting for jitter, wander and/or other phenomena, forwards compensated data 74 to termination module 62.

Termination module 62 represents a module that receives and terminates compensated data 74 to form a digital bitstream at a bit rate defined by the corresponding AAL. Termination module 62 may perform deblocking functions on compensated data 74 to form the bitstream. Termination module 62, in other words, may perform steps necessary to emulate the native service, such as T1 services 18A-18M, via a digital signal. Termination module 62 may, for example, perform any functions listed in ITU-T I.363.1, which defines AAL1, to generate bitstream data 76. Termination module 62 may forward bitstream data 76 to buffer module 64.

Buffer module 64 represents a module that buffers data, e.g., temporarily stores the data, such as bitstream data 76. Buffer module 64 may comprise any of the above listed forms of dynamic, static, or a combination of both dynamic and static memory. Buffer module 64 may, in the downstream path, store bitstream data 76 prior to forwarding bitstream data 76 to framer LIU 40. Buffer module 64 may also store clock value 70 received from clock recovery module 56 and synchronize the storage of clock value 70 with downstream bitstream data 76. That is, buffer module 64 may store clock value 70 such that the appropriate clock values 70 are stored parallel to corresponding bitstream data 76. Buffer module 64 may further receive upstream bitstream data from framer LIU 40 and store such data prior to forwarding this data upstream to PDU generation module 66. FIG. 3A illustrates this upstream/downstream bitstream data as "bitstream data 78."

PDU generation module 66 represents a module for generating protocol data units (PDUs) from upstream bitstream data 80. That is, PDU generation module 66 may generate a payload for each upstream ATM cell 68. For example, ATM provides that each payload comprise a 47-octets block, and PDU generation module 66 may perform the blocking functions to generate these 47-octet blocks from upstream bitstream 80. PDU generation module 66 forwards PDU data 82 to ATM module 58, whereupon, ATM module 58, as described above, packages PDU data 82 into ATM cells 68 for delivery upstream.

In this manner, SAR module 54 reassembles downstream ATM cells 68 back into a downstream digital signal, or bitstream 78, that emulates a native service. SAR module 54 also segments, by way of PDU generation module 66, upstream bitstream 80 to generate upstream ATM cells 68. More information concerning AAL1 and the segmentation and reassembling of native services, such as T1 services, can be found in International Telecommunication Union standard ITU-T I.363.1, titled "Series I: Integrated Services Digital Network," dated August, 1996, the entire contents of which are hereby incorporated by reference as if fully set forth in this disclosure.

As shown in FIG. 3B, next generation transport engine 34B comprises an application specific special product 84 ("ASSP 4"). ASSP 84 includes a PWE3 interworking module 86 ("interworking module 86"). ASSP 84 may be designed to implement as a dedicated hardware function interworking module 86. Interworking module 86 may conform to PWE3, as defined in any applicable standard, such as request for comments (RFC) 3985 and/or RFC 3916. Interworking module 86 represents a module that segments native services (which in this instance may include T1 services) into payloads, such as Ethernet frames or packets, encapsulates those packets to emulate characteristics of the native service over a packet switched network or, more particularly, an Ethernet transport, un-encapsulates the Ethernet packets and reassembles those Ethernet packets into the native services.

Interworking module 86 includes a clock recovery module 88, an Ethernet MAC module 90, a jitter buffer module 92, a payload recover module 94, a buffer module 96, and a payload generation module 98. As shown in FIG. 3B, interworking module 86 may be divided logically into two paths, a downstream path and an upstream path, the division of which are represented by the horizontal dashed line through interworking module 86. Modules 88-96 represent the downstream path, while modules 90, 96 and 98 represent the upstream path. While modules 90 and 98 operate in both the upstream and downstream paths, these modules 90, 98 are shown in FIG. 3B to reside only the downstream path for ease of illustration purposes.

Clock recovery module 88 represents a module that receives downstream Ethernet packets 100 and recovers a clock value from packets 100. Clock recovery module 88 may recover a clock value 102 by extracting output transmission bit timing information from the delivered packet stream or packets 100. Clock recover module 88, due to concerns of jitter, may employ a real-time transport protocol (RTP), such as that defined by RFC 3550. Clock recovery module 88 may recover clock value 102 so that synchronous services, such as T1 services, can be accurately emulated over an Ethernet transport. In other words, a framer LIU, such as framer LIU 40 of FIG. 2, may base the framing of T1 services, such as T1 s 18N-18Z of FIG. 1, on clock value 102.

Ethernet MAC module 90 also represents a module that receives downstream Ethernet packets 100. Ethernet MAC module 90 may further, however, receive payloads from payload generation module 98 of the upstream path. Ethernet MAC module 90 acts in the downstream path to un-package payloads and control data (collectively, "data 104") from Ethernet packets 100. The control information may include headers that define a number of different values, such as a frame number and a checksum value. Ethernet MAC module 90 may use the checksum value to verify the integrity of payloads extracted from packets 88. Ethernet MAC module 90 forwards data 104 to jitter buffer module 92.

Jitter buffer module 92 represents a module that receives and analyzes data 104 to account for any jitter and/or wander that may have occurred during transmission of Ethernet packets 100. In other words, compensation module 92 may, based on the frame number, reorder, delay, or otherwise compensate for the transmission of packets 100 over a packet-switched network or, better stated, an Ethernet transport. Jitter buffer module 92 may therefore smooth out the burst characteristic of packet switched networks to better emulate non-burst services, like T1 services. Jitter buffer module 92 may forward compensated data 106 to payload recovery module 94.

Payload recovery module 94 represents a module that receives and terminates compensated data 106 to form a digital bitstream. Termination module 94 may perform any functions required extract payloads from compensated data 106 and generate bitstream 108. Payload recovery module 94, in other words, performs any steps required to emulate the native service, such as T1 s 18A-18M, via a digital service or bitstream 108. Payload recover module 94 may, for example, perform any functions listed in the above RFCs 3985 and 3916 to recover payloads from compensated data 106 to generate bitstream data 108. Payload recovery module 94 forwards bitstream data 108 to buffer module 96.

Buffer module 96 represents a module that buffers, or temporarily stores, data, such as bitstream data 108. Buffer module 96 may comprise any of the above listed forms of dynamic, static, or a combination of both dynamic and static memory. Buffer module 96 may, in the downstream path, store bitstream data 108 prior to forwarding bitstream data 108 to framer LIU 40. Buffer module 96 may also store clock value 102 received from clock recovery module 88 and synchronize the storage of clock value 102 with downstream bitstream data 108. That is, buffer module 96 may store clock value 102 such that the appropriate clock values 102 are stored parallel to corresponding bitstream data 108. Buffer module 96 may further receive upstream bitstream data from framer LIU 40 and store such data prior to forwarding this data upstream to payload generation module 98. FIG. 3B illustrates this upstream/downstream bitstream data as "bitstream data 110."

Payload generation module 98 represents a module for generating payloads from upstream bitstream data 112. That is, payload generation module 98 may generate a payload for each upstream Ethernet packet 100. Payload generation module 98 may, therefore, fragment, segment or otherwise device bitstream data 112 into distinct data units or payloads and forward payload data 114 to Ethernet MAC module 90. Ethernet MAC module 90, as described above, packages payload data 114 into Ethernet packets 100 for delivery upstream by appending necessary control information or header information to payload data 114.

In this manner, interworking module 86 reassembles downstream Ethernet packets 100 back into a downstream digital signal, or bitstream 110, that emulates a native service and segments, by way of payload generation module 98, upstream bitstream 112 to generate upstream Ethernet packets 100. More information concerning PWE3, interworking module 86, modules 88-98 and the segmentation and reassembling of data corresponding to native services, such as T1 services, can be found in RFC 3916, titled "Requirements for Pseudo-Wire Emulation Edge-to-Edge (PWE3)," dated September, 2004, and RFC 3985, titled "Pseudo Wire Emulation Edge-to-Edge (PWE3) Architecture," dated March 2005, both published by the Network Working Group. The entire contents of both RFC 3916 and 3985 are hereby incorporated by reference as if fully set forth in this disclosure.

Although described above with respect to FPGA 52 and ASSP 84, the techniques are may be implemented in any combination of hardware, software, or both hardware and software. Thus, FPGA 52 and ASSP 84 are merely provided for purposes of illustration and the techniques may be implemented using any combination of processors, FPGAs, ASSPs, ASICs, or any other dedicated processing unit. That is, the first and second transport engines described above may be implemented in one or more of a processor, an FPGA, an ASSP, an ASIC, or a dedicated processing unit. Alternatively, the aspects attributed to each of FPGA 52 and ASSP 84 may be implemented as a series of instructions, e.g., software, executed by a programmable processor. Accordingly, the techniques should not be limited to the exemplary embodiment described above.

Figure 4:
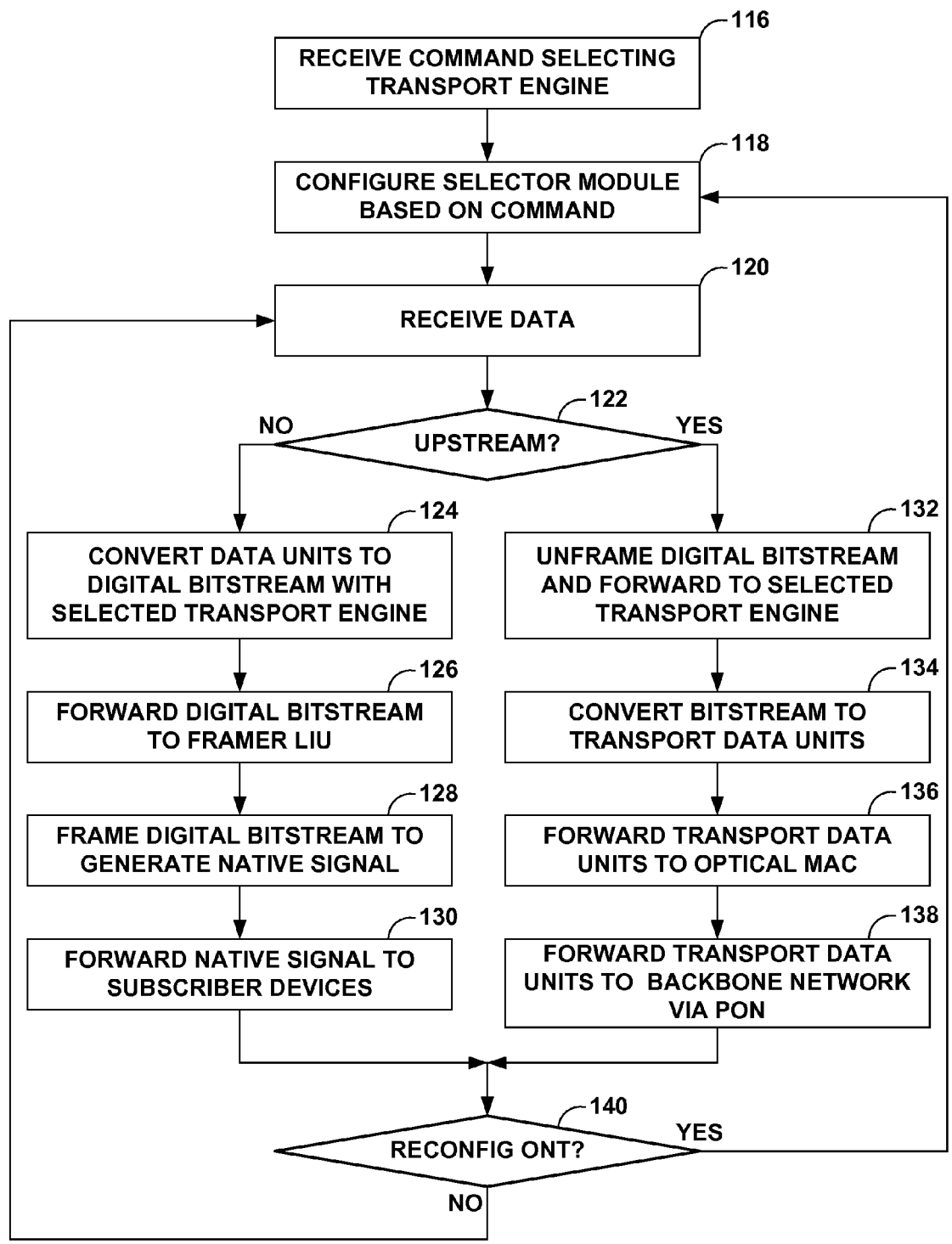
FIG. 4 is a flowchart illustrating exemplary operation of an ONT in accordance with upgrade-resilient techniques described in this disclosure.

FIG. 4 is a flowchart illustrating exemplary operation of an ONT, such as ONT 28 of FIG. 2, in accordance with the techniques described in this disclosure. Initially, an administrator, either by interfacing directly with management interface module 36 or by way of a provisioning system, specifies a command that selects one of transport engines 34. In one instance, management interface module 36 receives the command and configures selector module 38 based on the command (116, 118), as described above. In another instance, also as described above, management interface module 36 receives the command and activates one of transport engines 34 based on the command. Thus, the command may selectively active only one of the transport engines or select the output of one of the transport engines if they are both active at the same time.

After selectively configuring ONT 28 to select one of transport engines 34, ONT 28 begins to receive data (120). If the data is directed downstream ("NO" of decision block 122), ONT 28, as described above, employs the selected one of transport engines 34 to convert the transport data unit, e.g., ATM cells 68 of FIG. 3A or Ethernet packets 100 of FIG. 3B, to respective digital bitstream, such as digital bitstream 78 or 110, that emulates a native signal or service, such as one of T1s 18A-18M (124). That is, the selected one of transport engines 34 converts the received transport data units to the digital bitstream in accordance with the corresponding downstream path described in detail above with respect to FIGS. 3A and 3B. The selected one of transport engines 34 forwards the digital bitstream to frame LIU 40, which in turn, frames the digital bitstream to generate the native signal or service, such as T1 18N-18Z (126, 128). ONT 28 then forwards the native service to subscriber devices, such as subscriber devices 26 (130).

If, however, the data is directed upstream ("YES" of decision block 122), framer LIU 40 of ONT 28 receives data corresponding to the service via line 42 and unframes the data of the native service, such as T1s 18N-18Z, and forwards these unframed services as digital bitstreams, such as digital bitstream data 78 or 110, to the selectively configured one of transport engines 34 (132). The selected one of transport engines 34 converts the received bitstream data to transport data units, e.g., ATM cells 68 or Ethernet packets 100, in accordance with the corresponding upstream path described in detail above with respect to FIGS. 3A and 3B (134). Also as described above, the selected one of transport engines 34 forwards the transport data units to optical MAC unit 32, which in turn forwards the transport data units to backbone network 17, for example, via PON 20 (136, 138).

At some later point, the network administrator may interact with management interface 36 to selectively reconfigure ONT 28 via one or more commands such that ONT 28 selects the other one of transport engines 34 ("YES" of decision block 140). If so, management interface 36 configures selector module 38, for example, to select the other one of transport engines 34, which ONT 28 employs to processes data in the above described manner (i.e., according to blocks 118-138). If, however, ONT 28 is not selectively configured to select the other transport engine 34 ("NO" of decision block 140), ONT 28 continues to receive data and process that data using the previously selected one of transport engines 34 (i.e., according to blocks 120-138).

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable storage or other medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications.

Various embodiments have been described in this disclosure. These and other embodiments are within the scope of the following claims.

The invention claimed is:

1. An optical network terminal that terminates a fiber link of an optical network that conforms to a gigabit passive optical network (GPON) standard, the optical network terminal comprising:
    a single GPON media access control (MAC) unit that converts physical layer signals received over the optical network into data, wherein the data is received over the optical network via an asynchronous transport mode (ATM) transport or an Ethernet transport, wherein the single GPON MAC unit supports multiple layer two (L2) transports including the ATM transport and the Ethernet transport, and wherein the data comprises ATM cells or Ethernet packets;
    an asynchronous transfer mode (ATM) transport engine that converts the ATM cells into a digital representation of a T1 service in accordance with an ATM adaption layer (AAL) for one or more subscriber devices when the data is received over the optical network via the ATM transport; and
    an Ethernet transport engine that converts the Ethernet packets into the digital representation of the T1 service in accordance with a pseudo-wire emulation edge-to-edge (PWE3) protocol for the one or more subscriber devices when the data is received over the optical network via the Ethernet transport,
    wherein the optical network terminal is selectively configurable to select one of the ATM transport engine and the Ethernet transport engine to convert the data into the digital representation of the T1 service for the one or more subscriber devices.

2. The optical network terminal of claim 1, further comprising a management interface to receive input from a user that specifies which one of the ATM transport engine or the Ethernet transport engine to use,
    wherein, in response to the input, the management interface configures the optical network terminal to select the corresponding one of the ATM transport engine or the Ethernet transport engine to employ to convert the data received over the optical network into the digital representation of the T1 service.

3. The optical network terminal of claim 2,
    wherein the ATM transport engine converts the data received over the optical network via the ATM transport into first output data,
    wherein the Ethernet transport engine converts the data received over the optical network via the Ethernet transport into second output data, and the optical network terminal further comprising a selector module that is configurable to select between the first and second output data, wherein, based on the input, the management interface configures the optical network terminal by configuring the selector module to select one of the first or second output data.

4. The optical network terminal of claim 2, wherein, in response to the input, the management interface configures the optical network terminal to activate the ATM transport engine to convert the data received over the optical network into the digital representation of the T1 service.

5. The optical network terminal of claim 1,
wherein the digital representation of the T1 service comprises a first digital representation of the T1 service, and
wherein the optical network terminal is selectively configurable to select one of the ATM transport engine and the Ethernet transport engine on a per-service basis such that the optical network terminal selects the ATM transport engine to convert the data received over the optical network via the ATM transport into the first digital representation of the T1 service for the one or more subscriber devices and selects the Ethernet transport engine to convert the data received over the optical network via the Ethernet transport into a second digital representation of the T1 service for the one or more subscriber devices.

6. The optical network terminal of claim 1, further comprising:
a field programmable gate array (FPGA) that implements the ATM transport engine as a segmentation and reassembly (SAR) module in accordance with the AAL such that the FPGA receives and converts the ATM cells into the digital representation of the T1 service; and
an application specific special product (ASSP) that implements the Ethernet transport engine as an interworking module in accordance with the PWE3 protocol such that the ASSP receives and converts the Ethernet packets into the digital representation of the T1 service.

7. The optical network terminal of claim 1, wherein the ATM transport engine and the Ethernet transport engine are each implemented in one or more of a processor, a field programmable gate array (FPGA), an application specific special product (ASSP), an application specific integrated circuit (ASIC), or a dedicated processing unit.

8. The optical network terminal of claim 1,
wherein the single optical media access control (MAC) unit is the only optical MAC unit in the optical network terminal that converts physical layer signals received over the optical network into the data,
wherein single optical MAC unit interfaces with both of the ATM transport engine and the Ethernet transport engine,
wherein the optical network terminal further includes a framer line interface unit (LIU) that frames the data corresponding to the service for transmission over a line to which the framer LIU connects,
wherein the ATM transport engine interfaces with the framer line interface unit (LIU),
wherein the Ethernet transport engine interface with the framer LIU, and
wherein the framer LIU frames the digital representation of the T1 service from the ATM transport engine when the ATM cells are received over the optical network via the ATM transport and the digital representation of the T1 service from the Ethernet transport engine when the Ethernet packets are received over the optical network via the Ethernet transport.

9. A method comprising:
converting, with a single gigabit passive optical network (GPON) media access control (MAC) unit that supports multiple layer two (L2) transports including an asynchronous transport mode (ATM) transport and an Ethernet transport, physical layer signals received over an optical network that conforms with a GPON standard into data, wherein the data is received over the optical network via the ATM transport or the Ethernet transport, wherein the physical layer signals correspond to a GPON transport specified in the GPON standard, and wherein the data comprises ATM cells or Ethernet packets;
converting, with an ATM transport engine of an optical network terminal, the ATM cells into a digital representation of a T1 service in accordance with an ATM adaption layer (AAL) for one or more subscriber devices when the data is received over the optical network via the ATM transport;
converting, with an Ethernet transport engine of the optical network terminal, the Ethernet packets into the digital representation of the T1 service in accordance with a pseudo-wire emulation edge-to-edge (PWE3) protocol for the one or more subscriber devices when the data is received over the optical network via the Ethernet transport; and
selectively configuring the optical network terminal to select one of the ATM transport engine and the Ethernet transport engine to convert the data received over the optical network into the digital representation of the T1 service for the one or more subscriber devices.

10. The method of claim 9, wherein selectively configuring the optical network terminal comprises:
receiving, with a management interface of the optical network terminal, from a user input that specifies which one of the ATM transport engine or the Ethernet transport engine to use; and
configuring, in response to the input, the optical network terminal to select the corresponding one of the ATM transport engine or the Ethernet transport engine to employ to convert the data received over the optical network the digital representation of the T1 service.

11. The method of claim 10,
wherein converting the data received over the optical network via the ATM transport comprises converting, with the ATM transport engine, the data received over the optical network via the ATM transport into first output data,
wherein converting the data received over the optical network with the Ethernet transport comprises converting, with the Ethernet transport engine, the data received over the optical network via the Ethernet transport into second output data, and
wherein configuring the optical network terminal comprises configuring a selector module of the optical network terminal to select one of the first or second output data based on the input.

12. The method of claim 10, wherein configuring the optical network terminal comprises configuring the optical network terminal to activate the ATM transport engine to convert the ATM cells received over the optical network into the digital representation of the T1 service.

13. The method of claim 9,
wherein the digital representation of the T1 service comprises a first digital representation of the T1 service, and
wherein selectively configuring the optical network terminal comprises selectively configuring the optical network terminal to select one of the ATM transport engine and the Ethernet transport engine on a per-service basis such that the optical network terminal selects the ATM transport engine to convert the ATM cells received over the optical network via the ATM transport into the the first digital representation of the T1 service for the one or more subscriber devices and selects the Ethernet transport engine to convert the Ethernet packets received over the optical network via the Ethernet transport into a second digital representation of the T1 service for the one or more subscriber devices.

14. The method of claim 9,
wherein the ATM transport engine is implemented as a field programmable gate array (FPGA) that includes a segmentation and reassembly (SAR) module in accordance with the AAL such that the FPGA receives and converts the ATM cells into the digital representation of the T1 service; and
wherein the Ethernet transport engine is implemented as an application specific special product (ASSP) that includes an interworking module in accordance with the PWE3 protocol such that the ASSP receives and converts the Ethernet packets into the digital representation of the T1 service.

15. The method of claim 9,
wherein the optical network transmits the T1 service in accordance with the ATM transport and is upgraded to transmit the T1 service in accordance with the Ethernet transport,
wherein selectively configuring the optical network terminal includes selectively configuring the optical network terminal to account for the upgrade to the optical network by selecting the Ethernet transport engine.

16. The method of claim 9, wherein the ATM transport engine and the Ethernet transport engine are each implemented in one or more of a processor, a field programmable gate array (FPGA), an application specific special product (ASSP), an application specific integrated circuit (ASIC), or a dedicated processing unit.

17. An optical network terminal that terminates a fiber link of an optical network that conforms with a gigabit passive optical network (GPON) standard, the optical network terminal comprising:
a GPON media access control (MAC) means for converting physical layer signals received over the optical network into data, wherein the data is received over the optical network via an asynchronous transfer mode (ATM) transport or an Ethernet transport, wherein the single GPON MAC means support multiple layer two (L2) transports including the ATM transport and the Ethernet transport, and wherein the data comprises ATM cells or Ethernet packets;
an ATM transport processing means for converting the ATM cells into a digital representation of a T1 service in accordance with an ATM adaption layer (AAL) for one or more subscriber devices when the data is received over the optical network via the ATM transport; and
an Ethernet transport processing means for converting the Ethernet packets into the digital representation of the T1 service in accordance with a pseudo-wire emulation edge-to-edge (PWE3) protocol for the one or more subscriber devices when the data is received over the optical network via a Ethernet transport,
wherein the optical network terminal is selectively configurable to select one of the ATM transport engine and the Ethernet transport engine to convert the data into the digital representation of the T1 service for the one or more subscriber devices.

18. The optical network terminal of claim 17, further comprising:
a management means for receiving input from a user that specifies which one of the ATM transport processing means or the Ethernet transport processing means to use and, in response to the input, configuring the optical network terminal to select the corresponding one of the ATM transport processing means or the Ethernet transport processing means to employ to convert the data received over the optical network into the digital representation of the T1 service.

19. The optical network terminal of claim 18,
wherein the ATM transport processing means converts the data received over the optical network via the ATM transport into first output data,
wherein the Ethernet transport processing means converts the data received over the optical network via the Ethernet transport into second output data, and
the optical network terminal further comprising a selector means for selecting between the first and second output data,
wherein, based on the input, the management means configures the optical network terminal by configuring the selector means to select one of the first or second output data.

20. The optical network terminal of claim 18, wherein, in response to the input, the management means configures the optical network terminal to activate the ATM transport processing means to convert the ATM cells received over the optical network into the digital representation of the T1 service.

21. The optical network terminal of claim 17,
wherein the digital representation of the T1 service comprises a first digital representation of the T1 service, and
wherein the optical network terminal is selectively configurable to select one of the ATM transport processing means and the Ethernet transport processing means on a per-service basis such that the optical network terminal selects the ATM transport processing means to convert the ATM cells received over the optical network via the ATM transport into the first digital representation of the T1 service for the one or more subscriber devices and selects the Ethernet transport processing means to convert the data received over the optical network via the Ethernet transport into a second digital representation of the T1 service for the one or more subscriber devices.

22. The optical network terminal of claim 17,
wherein the ATM transport processing means comprises a field programmable gate array (FPGA) that implements an ATM transport engine as a segmentation and reassembly (SAR) module in accordance with the AAL such that the FPGA receives and converts the ATM cells into the digital representation of the T1 service; and
wherein the Ethernet transport processing means comprises an application specific special product (ASSP) that implements an Ethernet transport engine as an interworking module in accordance with the PWE3 protocol such that the ASSP receives and converts the Ethernet packets into the digital representation of the T1 service.

23. An optical system comprising:
an optical network terminal that terminates a fiber link of an optical network that conforms with a gigabit passive optical network (GPON) standard,
wherein the optical network terminal includes:

a single GPON media access control (MAC) unit that converts physical layer signals received over the optical network into data, wherein the data is received by the single physical layer transport unit over the optical network via an ATM transport or an Ethernet transport, wherein the single GPON MAC unit supports multiple layer two (L2) transports including the ATM transport and the Ethernet transport, and wherein the data comprises ATM cells or Ethernet packets;

an asynchronous transfer mode (ATM) transport engine that converts the ATM cells into a digital representation of a T1 service in accordance with an ATM adaption layer (AAL) for one or more subscriber devices when the data is received over the optical network via the ATM transport; and an Ethernet transport engine that converts the Ethernet packets into the digital representation of the T1 service in accordance with a pseudo-wire emulation edge-to-edge (PWE3) protocol for the one or more subscriber devices when the data is received over the optical network via the Ethernet transport, wherein the optical network terminal is selectively configurable to select one of the ATM transport engine and the Ethernet transport engine to convert the data into the digital representation of the T1 service for the one or more subscriber devices;

a central office terminal that receives the data corresponding to the service and transmits the data over the optical network as the physical layer signals via either the ATM transport or the Ethernet transport; and one or more remote terminals that receive and forward the data transmitted by the central office via either the ATM transport or the Ethernet transport to the optical network terminal.

24. The optical system of claim 23, wherein the optical network terminal further comprises a management interface to receive input from a user that specifies which one of the ATM transport engine or the Ethernet transport engine to use, and wherein, in response to the input, the management interface configures the optical network terminal to select the corresponding one of the ATM transport engine or the Ethernet transport engine to employ to convert the data received over the optical network into the digital representation of the T1 service.

25. The optical system of claim 24, wherein the ATM transport engine converts the data received over the optical network via the ATM transport into first output data, wherein the Ethernet transport engine converts the data received over the optical network via the Ethernet transport into second output data, and wherein the optical network terminal further comprises a selector module that is configurable to select between the first and second output data, wherein, based on the input, the management interface configures the optical network terminal by configuring the selector module to select one of the first or second output data.

26. The optical system of claim 24, wherein, in response to the input, the management interface configures the optical network terminal to activate the first L2 ATM transport engine to convert the data received over the optical network into the digital representation of the T1 service.

27. The optical system of claim 23, wherein the digital representation of the T1 service comprises a first digital representation of the T1 service, and wherein the optical network terminal is selectively configurable to select one of the ATM transport engine or the Ethernet transport engine on a per-service basis such that the optical network terminal selects the ATM transport engine to convert the ATM cells received over the optical network via the ATM transport into the first digital representation of the T1 service for the one or more subscriber devices and selects the Ethernet transport engine to convert the Ethernet packets received over the optical network via the Ethernet transport into a second digital representation of the T1 service for the one or more subscriber devices.

28. The optical system of claim 23, wherein the optical network terminal comprises:

a field programmable gate array (FPGA) that implements the ATM transport engine as a segmentation and reassembly (SAR) module in accordance with the AAL such that the FPGA receives and converts the ATM cells into the digital representation of the T1 service; and an application specific special product (ASSP) that implements the Ethernet transport engine as an interworking module in accordance with the PWE3 protocol such that the ASSP receives and converts the Ethernet packets into the digital representation of the T1 service.

29. The optical system of claim 23, wherein the ATM transport engine and the Ethernet transport engine are each implemented in one or more of a processor, a field programmable gate array (FPGA), an application specific special product (ASSP), an application specific integrated circuit (ASIC), or a dedicated processing unit.

30. A non-transitory computer-readable storage medium comprising instructions that cause one or more programmable processors to:

convert, with a single gigabit passive optical network (GPON) media access control (MAC) unit that supports multiple layer two (L2) transports including an asynchronous transport mode (ATM) transport and an Ethernet transport, physical layer signals received over an optical network that conforms with a GPON standard into data, wherein the data is received over the optical network via an ATM transport or an Ethernet transport wherein the physical layers signals correspond to a GPON transport specified in the GPON standard, and wherein the data comprises ATM cells or Ethernet packet;

convert, with an ATM transport engine of an optical network terminal, the ATM cells into a digital representation of a T1 service in accordance with an ATM adaption layer (AAL) for one or more subscriber devices when the data is received over the optical network via the ATM transport convert, with an Ethernet transport engine of the optical network terminal, the Ethernet packets into the digital representation of the T1 service in accordance with a pseudo-wire emulation edge-to-edge (PWE3) protocol for the one or more subscriber devices when the data is received over the optical network via the Ethernet transport; and selectively configure the optical network terminal to select one of the ATM transport engine and the Ethernet transport engine to convert the data received over the optical network into the digital representation of the T1 service for the one or more subscriber devices.

* * * * *